United States Patent [19]
Dully

[11] 3,940,082
[45] Feb. 24, 1976

[54] BLOCKING MEMBER FOR LOCKING MECHANISM OF A VEHICLE OCCUPANT RESTRAINT BELT RETRACTOR

[75] Inventor: Floyd I. Dully, Detroit, Mich.

[73] Assignee: General Motors Corporation, Detroit, Mich.

[22] Filed: Feb. 10, 1975

[21] Appl. No.: 548,527

[52] U.S. Cl. ......................................... 242/107.4 A
[51] Int. Cl.² ..................... A62B 35/02; B65H 75/48
[58] Field of Search .............. 242/107.4 R, 107.4 A; 74/575–577

[56] References Cited
UNITED STATES PATENTS

| | | | |
|---|---|---|---|
| 3,831,878 | 8/1974 | Griffin | 242/107.4 A |
| 3,897,913 | 8/1975 | Hall | 242/107.4 A |

*Primary Examiner*—Stanley N. Gilreath
*Assistant Examiner*—John M. Jillions
*Attorney, Agent, or Firm*—C. E. Leahy

[57] ABSTRACT

An inertia locking mechanism of a vehicle occupant restraint belt retractor includes a blocking member that moves forwardly in response to frontal vehicle deceleration so as to block movement of the locking member of the mechanism back towards a nonlocking position after movement toward a locking position under the impetus of an inertia member. The blocking member has a lower end pivotally supported on the housing of the retractor about a transverse vehicle axis and extends upwardly between forward and rearward stops to an upper weighted portion that normally biases the blocking member rearwardly into engagement with the rearward stop. An actuating portion of the locking member normally engages the weighted portion of the blocking member and a blocking portion of the blocking member is located rearwardly of the actuating portion. When the rate of forward vehicle movement is decelerated abruptly, the inertia member moves the locking member toward a locking position where locking portions thereof engage a belt reel of the retractor to prevent belt unwinding reel rotation, and the blocking member moves forwardly under the actuating portion of the locking member so as to block movement thereof back toward the nonlocking position before the termination of the deceleration. The blocking member engages the forward stop to prevent the center of gravity of this member from moving forward of its pivotal support axis so that gravity will return the blocking member to its rearward position engaging the rearward stop.

3 Claims, 5 Drawing Figures

U.S. Patent  Feb. 24, 1976  3,940,082
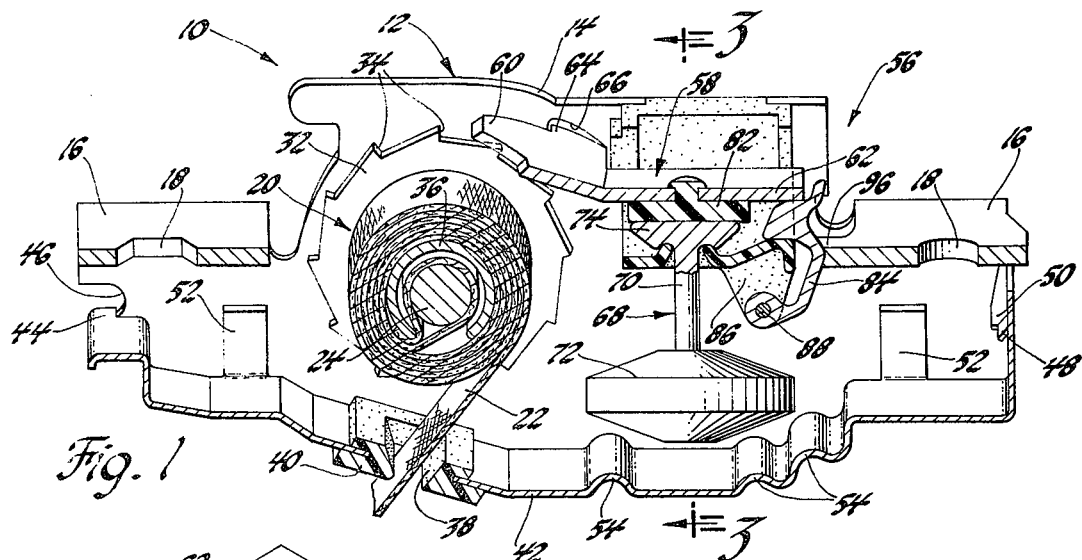
Fig. 1
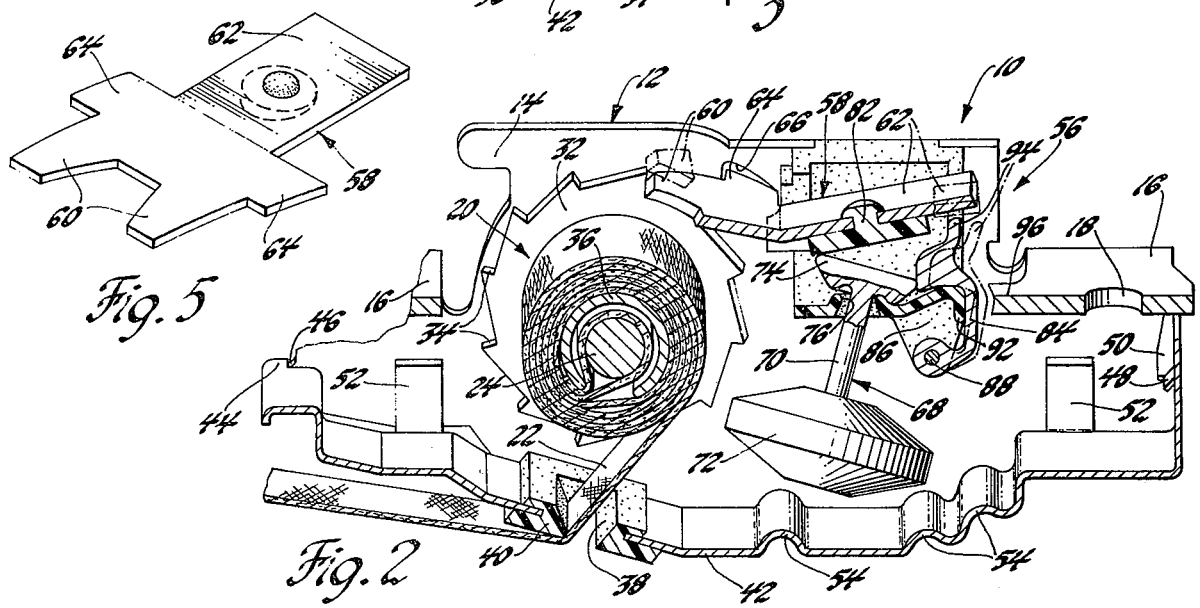
Fig. 5
Fig. 2
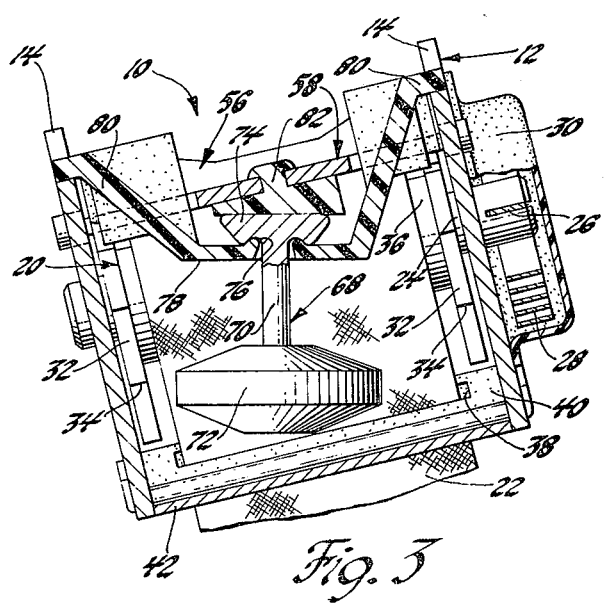
Fig. 3
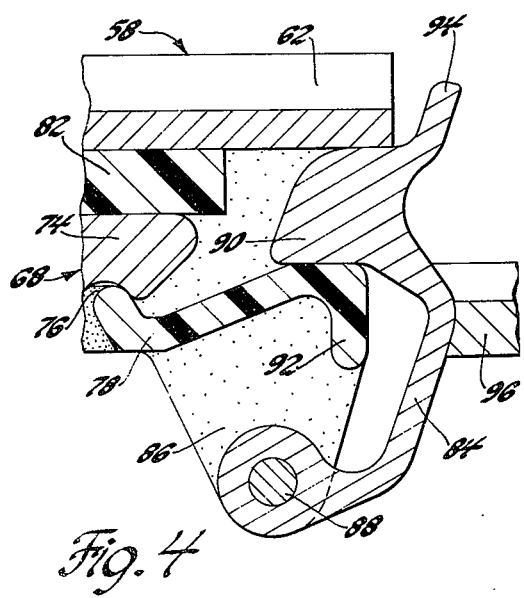
Fig. 4

3,940,082

BLOCKING MEMBER FOR LOCKING MECHANISM OF A VEHICLE OCCUPANT RESTRAINT BELT RETRACTOR

BACKGROUND OF THE INVENTION

This invention relates to an inertia locking mechanism for a vehicle occupant restraint belt retractor.

Vehicle occupant restraint belt retractors conventionally include a metal housing that rotatably supports a belt reel on which a restraint belt of either the lap or shoulder type is wound. A spring normally extends between the reel and the housing so as to bias the reel in a belt winding direction. At each of its ends, the reel normally includes an annular ratchet plate with teeth that face in the belt unwinding direction of rotation. Different types of locking members have been utilized in the past in order to engage the ratchet teeth of the reel to prevent the belt unwinding reel rotation.

Vehicle sensitive inertia belt locking mechanisms of the type the present invention relates to have also been known for some time. These locking mechanisms include an inertia member such as a pendulum that acts on a locking member in response to abrupt vehicle acceleration or deceleration to move the locking member to its reel locking position in engagement with the ratchet teeth on the end plates of the reel. Thus, the reel may be unwound to supply an increased length of belt at all times except during abrupt changes in its rate of movement.

SUMMARY OF THE INVENTION

One feature of the present invention is that it provides a vehicle occupant restraint belt retractor with a vehicle sensitive inertia locking mechanism including a blocking member that moves forwardly under the impetus of abrupt frontal vehicle deceleration to block movement of the locking member of the locking mechanism back toward its nonlocking position before the vehicle deceleration terminates.

Another feature of the invention is that the blocking member has a lower end pivotally mounted on the housing and an upper weighted portion that normally biases the blocking member rearwardly into engagement with a rearward stop on the housing, and a forward stop on the housing engages the blocking member before the center of gravity thereof moves forward of the pivotal mounting axis of its lower end so that gravity returns the blocking member to its rearward position when the vehicle deceleration terminates. Another feature of the invention is that the locking member of the locking mechanism includes an actuating portion on which an inertia member acts to move the locking member to its locking position, and this actuating portion engages both the inertia member and the weighted portion of the blocking member in the normal rest position of the retractor with a blocking portion of the blocking member located rearwardly of the actuating portion, and movement of the actuating portion under the impetus of the inertia member movement permits the movement of the blocking member to move its blocking portion beneath the actuating portion to thereby provide the blocking action of the member.

BRIEF DESCRIPTION OF THE DRAWINGS:

These and other features, objects and advantages of the present invention are readily apparent from the following detailed description of the preferred embodiment and the drawings in which:

FIG. 1 is a sectional view taken through a vehicle occupant restraint belt retractor that includes a vehicle sensitive inertia locking mechanism according to this invention with the locking mechanism shown in an unlocked condition so that belt unwinding is permitted;

FIG. 2 is a view similar to FIG. 1 but shows the locking mechanism in a locking condition where a blocking member blocks movement of the locking member of the mechanism back toward its nonlocking position;

FIG. 3 is a sectional view of the retractor taken generally along line 3—3 of FIG. 1;

FIG. 4 is a view that shows an enlarged portion of FIG. 1 to illustrate the blocking member of the locking mechanism; and FIG. 5 is a perspective view of the locking member of the locking mechanism.

DETAILED DESCRIPTION OF THE PREFERRED EMBODIMENT

Referring generally to FIG. 1 of the drawings, a vehicle occupant restraint belt retractor is generally indicated by numeral 10 and includes a metal housing 12. As seen by additional reference to FIG. 3, the housing 12 includes side walls 14 that are spaced in a parallel relationship with respect to each other. The side walls 14 are connected to each other at each end of the retractor by mounting flanges 16. Apertures 18 in each of the mounting flanges 16 are adapted to receive mounting bolts that attach the retractor to a vehicle body. In the particular retractor shown, this mounting is oriented so that the left-hand end of the retractor as shown in FIG. 1 faces toward the forward end of the vehicle and the right-hand end faces toward the rearward end of the vehicle. The side walls 14 thus extend in a longitudinal direction with respect to the vehicle.

A belt reel 20 is located between the side walls 14 of the retractor housing and windingly receives a belt 22. The belt reel includes a central shaft 24 whose opposite ends are received by circular apertures in the housing side walls to support the reel for rotation in both belt winding and unwinding directions. The FIG. 3 right-hand end of shaft 24 defines a slot that receives the inner spring end 26 of a spiral spring 28. The outer end of spring 28, not shown, is suitably fixed to the adjacent housing side wall 14 so that the spring normally biases the reel in a belt winding direction. A plastic cover 30 that is suitably secured to this particular housing side wall 14 encloses the spring 28 and its adjacent shaft end. Combined reference to FIGS. 1 and 3 show that each end of shaft 24 supports an associated end plate 32 with ratchet teeth 34 that define annular ratchet configurations. These ratchet teeth 34 face in the belt unwinding direction of rotation so as to cooperate in providing reel locking against belt unwinding rotation in a manner that will be described more fully later. A horseshoe-shaped sleeve 36, FIG. 1, receives the shaft 24 and has its opposite ends suitably affixed to the respective end plates 32. The belt 22 is looped over the shaft 24 and then wound about the sleeve 36 with its outer end extending downwardly through a slot 38 and a plastic belt guide 40. A cover 42 supports the belt guide 38 and is itself supported at the lower ends of the housing side walls 14. This support of the cover 42 is accomplished in the disclosed embodiment by mounting ears 44 on the opposite lateral sides of the forward left-hand end of the cover. Each of these mounting ears 44 is received by an associated notch 46 in the forward end of its adjacent housing side wall 14. The rearward right end of cover 42 includes mounting tangs 48 that snap over attachment surfaces 50 as the cover is rotated upwardly into position after first positioning the mounting ears 44 within their respective notches 46. Guides 52 of the cover guide it upwardly between the housing side walls 14 so that corrugations 54 in the cover 42 are received between the housing side walls 14 to provide a sturdy construction that prevents these walls 14 from moving toward each other.

The belt reel 20 is locked against belt unwinding rotation by a vehicle sensitive inertia locking mechanism generally indicated by 56. This locking mechanism includes a fork-shaped locking member 58 that is best illustrated in FIG. 5. The fork-shaped locking member includes spaced tine portions 60 at one of its ends and a handle portion 62 at its other end. Mounting ears 64 project laterally from each side of the locking member 58 intermediate its ends and are received within wedge-shaped apertures 66 in the housing side walls 14 to pivotally mount the locking member 58 for movement between its FIG. 1 nonlocking position and its FIG. 2 locking position. The tine portions 60 of the locking member 58 are located above the ratchet teeth 34 on the reel 20 when the locking member is positioned in its FIG. 1 nonlocking position so that the belt 22 can be freely withdrawn from the retractor upon overcoming the bias of winding spring 28. Movement of the locking member 58 to its FIG. 2 locking position pivots the locking member 58 so that the tine portions 60 move downwardly into engagement with a pair of aligned ratchet teeth 34 on the end plates 34 of the reel 20 and belt withdrawal from the retractor is thereby terminated.

A pendulum 68 of the inertia locking mechanism 56 causes the movement of the locking member 58 from its nonlocking position to its locking position in response to abrupt vehicle acceleration or deceleration in any horizontal direction. This pendulum 68 includes an arm 70 that is normally oriented in a vertical direction as can be seen by combined reference to FIGS. 1 and 3. The lower end of pendulum arm 70 supports a weight 72 and its upper end mushrooms outwardly into a circular control portion 74. The pendulum arm 70 extends upwardly through a circular aperture 76 in a plastic pendulum support member 78. As can be seen best in FIG. 3, this pendulum support member 78 has an unsymmetrical U-shaped configuration with ends 80 supported by the respective housing side walls 14 in any suitable manner. The annular lip of support member 78 which defines the aperture 76 is oriented in a horizontal plane so as to permit the pendulum to normally depend with arms 70 in its vertical orientation. The unsymmetrical configuration of the pendulum support member is necessitated in the particular embodiment disclosed because this retractor is used as a shoulder belt retractor and is mounted on the tilted outboard roof edge of a vehicle body in an angular relationship with respect to the horizontal. It is, of course, possible to utilize this retractor so that it is oriented in a true horizontal orientation with a symmetrical pendulum support member. A wedge-shaped control member 82, see FIG. 3, is suitably affixed to the lower side of the locking member handle portion 62. Gravity acting on the handle portion 62 biases the locking member 58 to its nonlocking position where the control member 82 is fully engaged with the upper side of the pendulum control portion 74. Upon abrupt vehicle acceleration or deceleration of a predetermined magnitude in any horizontal direction, the pendulum 68 tips about its control portion 74 in the manner shown in FIG. 2 and moves the locking member handle portion 62 upwardly to cause locking of the retractor so that belt withdrawal is then terminated.

The locking mechanism 56 also includes a blocking member 84 located on the rearward side of the pendulum support member 78 as can be seen in FIGS. 1 and 2. As best seen in FIG. 4, the pendulum support member 78 has a depending flange 86 which pivotally supports a lower end of the blocking member 84 on a pin 88 which is located in a horizontal orientation extending transversely with respect to the longitudinal axis of the vehicle. The blocking member 84 also has an upper weighted portion 90 that is located above a forward stop 92 on the pendulum support member. A blocking portion 94 of blocking member 84 extends upwardly and slightly to the rear from the weighted portion 90 and is located rearwardly of the handle portion 62 of the locking member. The center of gravity of blocking member 84 is always located rearwardly of pin 88 and this member is thus gravity biased in a rearward direction so as to normally engage a rearward stop 96 on the rearward mounting flange 16 of the retractor housing. The rearward end of the handle portion 62 on the locking member engages the upper side of the weighted portion 90 on the blocking member in this position while the plastic control member 82 secured to the lower side of the locking member handle portion 62 at the same time engages the upper control portion 74 on the pendulum.

The blocking member 84 of the retractor locking mechanism functions during abrupt deceleration of the forward rate of vehicle movement. As the vehicle decelerates abruptly, pendulum 68 pivots forwardly in the manner shown by FIG. 2 and tips the locking member 58 toward its locking position. This deceleration also acts on the weighted portion 90 of the blocking member 84 and tends to pivot the blocking member 84 counterclockwise about pin 88 away from the rearward stop 96 and toward the forward stop 92. The locking member reaches an intermediate position during this locking movement which is shown by the phantom line indicated tine portion 60 and the rear end of the handle portion 62 in FIG. 2. The tine portion 60 in this intermediate position is located just slightly spaced from the tips of the ratchet teeth 34 so that reel locking is not then actuated. The angular rotation of the blocking member 84 is tuned to the locking member 58 and pendulum 68 so that its blocking portion 94 moves under the rearward end of the locking member handle portion 62 as the locking member 58 reaches the intermediate position. This blocking relationship is shown by the phantom line indicated blocking portion 94 of the blocking member 84 as shown in FIG. 2. The blocking relationship of the blocking member 84 prevents the locking member 58 from moving back toward its nonlocking position while the vehicle's rate of forward movement is decelerating. The blocking member 84 continues to pivot forwardly as the pendulum 68 moves the locking member 58 to its locking position and the blocking member 84 then engages the stop 92 which prevents the center of gravity of the blocking member 84 from moving forwardly past the pin 88. Thus, as the forward rate of vehicle deceleration subsides, gravity returns the blocking member 84 to its FIGS. 1 and 4 position in engagement with the rearward stop 96 and concomitantly returns the locking member 58 to its nonlocking position.

This invention thus provides a blocking member for the locking mechanism of a vehicle sensitive inertia locking occupant restraint belt retractor.

What is claimed is:

1. In a vehicle occupant restraint retractor including a housing, an elongated restraint belt, a reel attaching one end of the belt and being mounted on the housing for belt winding and unwinding rotation in opposite directions, and spring means for biasing the reel in the belt winding direction of rotation, an inertia sensitive mechanism for locking the reel against rotation relative the housing comprising:

a locking member coacting between the housing and the reel and including a locking portion and an actuating portion, the actuating portion being movable from a first position to a second position to move the locking member from a nonlocking position to a locking position in which the reel is locked from rotation relative the housing, the actuating portion moving through an intermediate position between the first and second positions, a first inertia member movable in response to predetermined inertia forces, the first inertia member engaging the actuating portion of the locking member to effect movement of the locking member from the first position to the second position; and a second inertia member movable under the impetus of inertia forces and moving into the path of movement of the actuating portion between the first and intermediate positions thereof so that the second inertia member blocks movement of the locking member toward the nonlocking position, the second inertia member being tuned to the first inertia member and the locking member so as to move into the blocking relationship with the locking member as the actuating portion of the locking member reaches the intermediate position.

2. In a vehicle occupant belt retractor including a housing, an elongated restraint belt, a reel attaching one end of the belt and being mounted on the housing for belt winding and unwinding rotation in opposite directions, ratchet teeth arranged about the reel in spaced annular configurations on opposite sides of the belt and facing in the belt unwinding direction of rotation, and spring means for biasing the reel in the belt winding direction of rotation, an inertia sensitive locking mechanism comprising:
a first inertia member mounted on the housing for actuating movement in response to predetermined changes of the rate of vehicle movement;
a locking member pivotally mounted on the housing and including locking portions and an actuating portion, the actuating portion being engaged by the first inertia member so that the actuating movement of the first inertia member moves the actuating portion from a first position to a second position to move the locking member from a nonlocking position to a locking position with respect to the reel, the locking portions being spaced from the reel in the nonlocking position to permit belt unwinding reel rotation and being engaged with the ratchet teeth in the locking position to prevent such belt unwinding reel rotation, and the actuating portion moving through an intermediate position where the locking portions are just slightly spaced from the ratchet teeth on the reel; and
a second inertia member mounted on the housing for movement under the impetus of inertia forces present upon change of rate of vehicle movement, the second inertia member moving into the path of movement of the actuating portion between the first and intermediate positions thereof so that the second inertia member blocks movement of the locking member toward the nonlocking position, and the second inertia member being tuned to the first inertia member and locking member so as to move into the blocking relationship with the locking member as the actuating portion of the locking member reaches the intermediate position.

3. In a vehicle occupant belt retractor including a housing, an elongated restraint belt, a reel attaching one end of the belt and being mounted on the housing for belt winding and unwinding rotation in opposite directions, ratchet teeth arranged about the reel in spaced annular configurations on opposite sides of the belt and facing in the belt unwinding direction of rotation, and spring means for biasing the reel in the belt winding direction of rotation, a vehicle sensitive inertia locking mechanism comprising:
an inertia member mounted on the housing for forward actuating movement in response to abrupt deceleration of the rate of forward vehicle movement;
a locking member pivotally mounted on the housing and including locking portions and an actuating portion, the actuating portion being engaged by the inertia member so that the forward actuating movement of the inertia member moves the actuating portion from a first position to a second position to move the locking member from a nonlocking position to a locking position with respect to the reel, the locking portions being spaced from the reel in the nonlocking position to permit belt unwinding reel rotation and being engaged with the ratchet teeth in the locking position to prevent such belt unwinding reel rotation, and the actuating portion moving through an intermediate position where the locking portions are just slightly spaced from the ratchet teeth on the reel; and
a blocking member mounted on the housing for forward movement under the impetus of inertia forces present as the forward rate of vehicle movement is decelerated, the blocking member moving forwardly into the path of movement of the actuating portion between the first and intermediate positions thereof so that the blocking member blocks movement of the locking member back toward the nonlocking position, and the blocking member being tuned to the inertia member and locking member so as to move into the blocking relationship with the locking member as the actuating portion of the locking member reaches the intermediate position.

\* \* \* \* \*